United States Patent [19]

Oku

[11] 4,176,996
[45] Dec. 4, 1979

[54] AUTOMATIC POSITIONING SYSTEM FOR A CARRIAGE IN A STORAGE AND RETRIEVAL SYSTEM

[75] Inventor: Nobuyuki Oku, Osaka, Japan

[73] Assignee: Itoki Kosakusho Co., Ltd., Osaka, Japan

[21] Appl. No.: 865,694

[22] Filed: Dec. 29, 1977

[30] Foreign Application Priority Data

Dec. 29, 1976 [JP] Japan ................... 51-159639

[51] Int. Cl.² ............................................. B65G 1/04
[52] U.S. Cl. ................................................... 414/273
[58] Field of Search ................. 214/16.4 R, 16.4 A; 414/273

[56] References Cited

U.S. PATENT DOCUMENTS 3,526,326  9/1970  Castaldi .................... 214/16.4 A Primary Examiner—Robert G. Sheridan
Attorney, Agent, or Firm—Hopgood, Calimafde, Kalil, Blaustein & Lieberman

[57] ABSTRACT

An automatic positioning system for a commodity carriage in an automatic storage system includes shelves arranged to have commodity storage positions extending in the vertical and horizontal direction and a commodity carriage adapted to access each of the storage positions. Code marks identify each of the storage positions and a first group code scanning device, responsive to the code marks, detects groups of N adjacent storage positions and slows the movement of the commodity carriage in response thereto. N individual code scanning devices, responsive to the code marks, detect individual storage positions and the commodity carriage is stopped in response to the outputs of the group and individual scanning devices.

8 Claims, 8 Drawing Figures

AUTOMATIC POSITIONING SYSTEM FOR A CARRIAGE IN A STORAGE AND RETRIEVAL SYSTEM

FIELD OF THE INVENTION

This invention relates to an automatic positioning system for a commodity transfer carriage in an automatic storage system and more particularly to a positioning system which utilizes electronic scanning devices to accurately position the commodity carriage.

BACKGROUND OF THE INVENTION

Apparatus to automatically retrieve and store commodities stored on shelves is already known.

Such apparatus includes, in general, a commodity transfer platform such as a carriage to move along the storage shelves. Position codes are given to each storage position in the shelves, and a control circuit controls the operation of the commodity carriage by detecting the current storage position of the carriage and by detecting when the carriage reaches the designated storage position. In addition, the prior art apparatus includes a device for transferring commodities between storage positions on the shelves and the commodity carriage and a control circuit to control the complete storage operation.

The known prior art apparatus is able to retrieve a designated commodity and to automatically store a designated commodity by putting in designation code of the commodity at a receiving and delivery section of the apparatus. An example of such known prior art apparatus is illustrated in U.S. Pat. No. 3,526,326.

With the prior art apparatus, the position code for each storage position, necessary to control the position of the commodity carriage, consists of a vertical position code and a horizontal position code. These code marks are arranged in the vertical direction and the horizontal direction along the storage shelves. Code mark scanning devices installed on the carriage, read the code marks and position the carriage in response thereto. The actual position of these prior art code marks and the designated storage positions are not identical due to errors in applying the code marks to the shelves which are evident at the shelf corners. Therefore exact positioning of the carriage may not be achieved, and consequently, it becomes necessary to have a larger storage space than actually required by the volume of commodities to be stored and storage density is decreased.

Furthermore, as the number of storage positions increase, the number of digits or marks in the position code increases and installation of the code marks becomes burdensome.

It is therefore an object of this invention to provide a positioning system for a commodity carriage which can increase the storage density while reducing the complexity of the position code.

SUMMARY OF THE INVENTION

In accordance with the invention an automatic positioning system for a commodity carriage includes shelves arranged to have vertical and horizontal commodity storage positions, a commodity carriage designed to move up and down, and right and left, along the front face of the shelves, a vertical position code mark and a horizontal position code mark, for each of the storage positions, the code marks being arranged within the movable range of the carriage, a code scanning device to read the position code, said scanning device designed to move with the carriage, and a control circuit responsive to the code scanning device, to control the operation of the carriage so as to stop the carriage when it faces a designated storage position.

It is a feature of the invention that the position code identifies N storage spaces, in either the vertical direction or the horizontal direction as one group of storage spaces. (N is a natural number selected at random, being far smaller than the number of storage positions arranged in the horizontal or vertical direction but larger than 1).

It is another feature of the invention that small numbers of storage positions, extending in the vertical or horizontal direction, are grouped together. A position code is given to each group, and the code designates storage positions within the group.

It is another feature of the invention that each position code mark corresponds to a group of storage positions and a special position mark is included among the N storage spaces.

In accordance with another aspect of the invention, N mark scanning devices, to detect the position marks, are installed on the carriage to correspond to the N storage positions. The detecting circuit is built into the control circuit to detect which one of the N mark detecting devices have an output, and apparatus controlling the movement of the carriage receives an output from the mark detecting devices to correspond to the designated storage position.

The foregoing and other objects and features of this invention will be more fully understood from the following description of an illustrative embodiment thereof taken in conjunction with the accompanying drawings.

DETAILED DESCRIPTION

The invention will now be explained with reference to the drawings.

Figure 1:
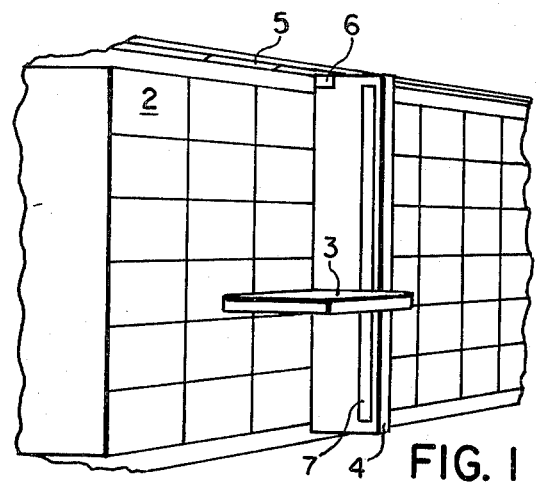
FIG. 1, storage portion of the automatic retrieval and storage apparatus of the instant invention, FIG. 2, control circuit diagram for the storage and retrieval apparatus, FIG. 3, a partial front view of a storage shelf, FIG. 4, a front view of the side of the carriage facing the shelf, FIGS. 5a–5b, an illustration of the position code marks and timing diagram for the control circuit, FIG. 6, a block diagram of the control circuit, and FIG. 7, an alternative block diagram for the control circuit.

FIG. 1 illustrates a general view of the apparatus which is a shelf arranged to provide vertical and horizontal storage space. Commodity carriage 3 is designed to move along the front face of the storage shelf. Commodity carriage 3 is slidably attached to vertical column 4 which moves in a horizontal direction along upper and lower guide rails. Consequently, commodity carriage 3 is, by combination of the horizontal movement of column 4 and the vertical movement on the column, able to move in any designated direction along the front face of the shelf.

On the ceiling above movable column 4, code mark 5 is a horizontal position code for storage positions on the shelf. Scanning device 6 is installed on movable column 4 to read the position marks. Code mark 7 is a vertical position code for storage positions on the shelf and code mark 7 is marked on the carriage 3. A scanning device 13 (not shown) is also utilized to read code mark 7.

Figure 2:
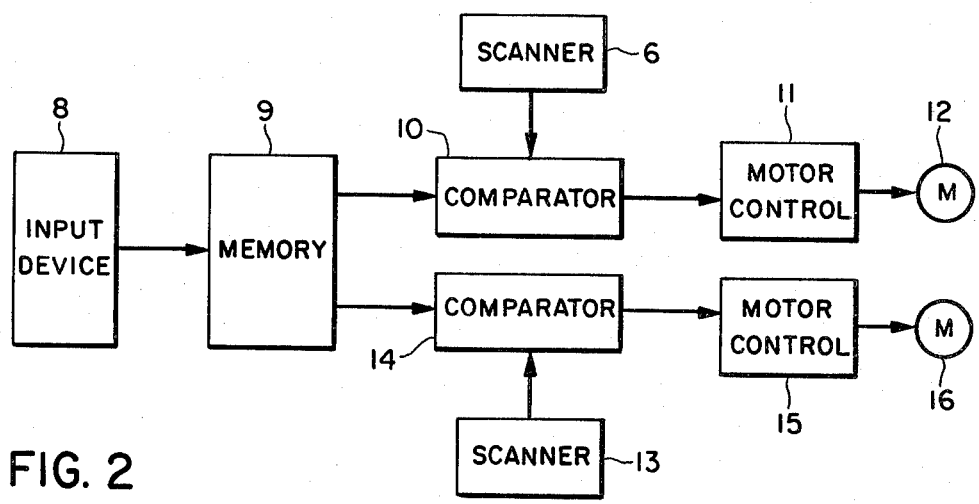

Refer to FIG. 2 wherein it is shown that information to identify a designated storage position is placed into the storage apparatus by input device 8. The information is stored in temporary memory 9 and consists of a vertical position code and a horizontal position code. The output of the horizontal code scanning device 6 and the horizontal position code stored in temporary memory 9 are compared by comparing device 10. When a comparison is reached motor control circuit 11 operates to stop motor 12 which drives carriage 3 in the horizontal direction. The output of the vertical code scanning device 13 and the vertical position code, also stored in temporary memory 9, are compared by comparing device 14. When a comparison is reached motor control circuit 15 operates to stop motor 16 which drives moveable column in the vertical direction. The combination of the vertical and horizontal codes serve to position the carriage at the designated storage position.

However, as described above, a system which assigns position marks to every storage position in the vertical direction and in the horizontal direction has certain disadvantages.

Figure 3:
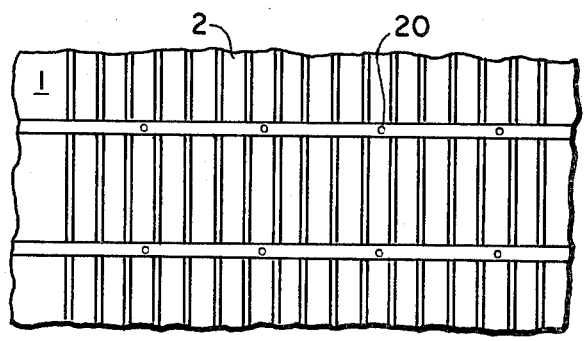
Figure 4:
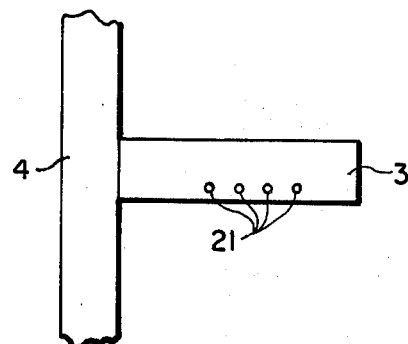

Refer now to FIGS. 3-6 which illustrate the operation of the instant invention. FIG. 3 illustrates a front view of one portion of the shelf. FIG. 4 is a front view of the carriage on the side facing the shelf and FIG. 5 illustrates the relation between the position mark on the shelf (hereinafter called code strip), the code strip scanning device on the carriage, and the horizontal position code mark.

FIG. 3 illustrates a group of storage positions (4 in this example) arranged in the horizontal direction. One of the storage positions, second from the right in this example, is marked with code strip 20.

FIG. 4 illustrates that four code strip scanning devices 21 are installed on the carriage on the side facing the shelf. The four scanning devices correspond to the four storage positions among the group of storage positions. A horizontal position code, hereinafter called the H address code, is given to the four adjacent storage positions. (FIG. 1 NO 5.) The relationship between code strip 20, included in each group of storage positions in the horizontal direction, and the horizontal position code mark 5, the H address code, is shown in FIG. 5(a).

Figure 5A:
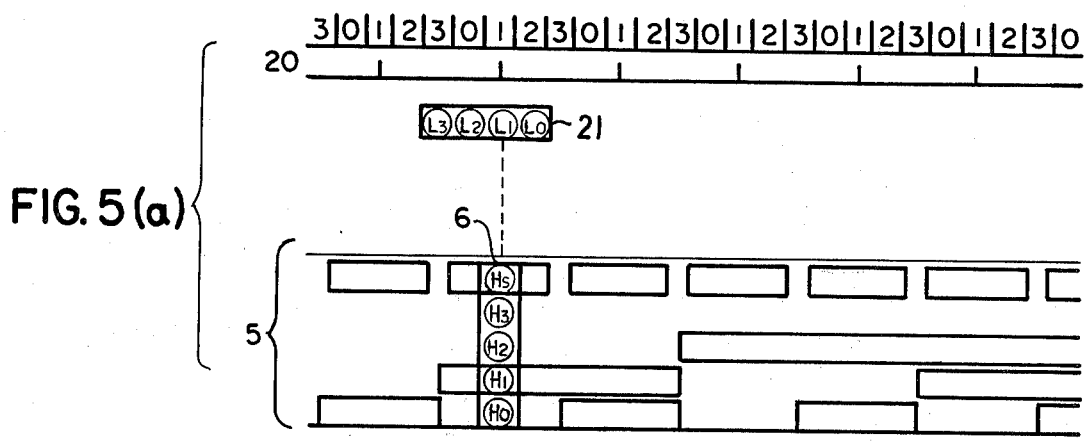

FIG. 5(a) also shows code strip scanning devices 21 and horizontal code mark scanning device 6. Each storage position within a group of storage positions is identified by numbers LO-L3, hereinafter called the L address code.

Scanning device 6 consists of 5 scanning devices HO, H1, H2, H3 and HS. Scanning device HS is utilized to read a mark indicating the border between adjoining code marks.

Four code strip scanning devices 21 (LO-L3) are installed to face the adjoining 4 storage positions and are arranged at the same regular intervals in the horizontal direction. When carriage 3 is moved in the horizontal direction, i.e., when movable column 4 is moved, an output is obtained from scanning device 6 and code strip devices 21.

Figure 5B:
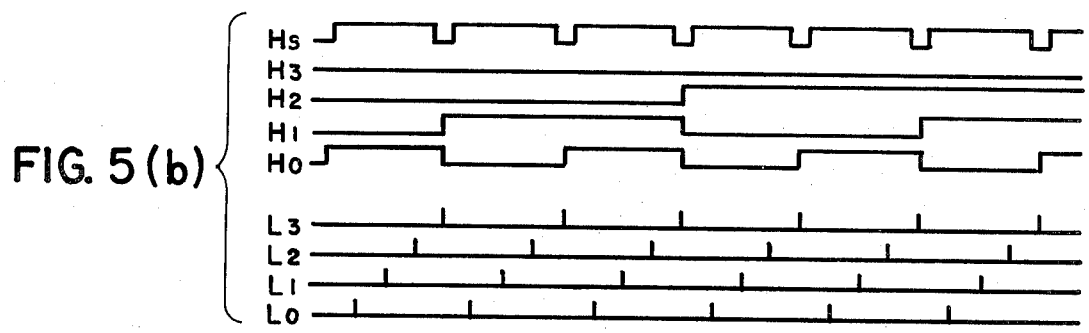

FIG. 5(b) shows the change in the output of each scanning device HO-HS, and LO-L3, when movable column 4 is moved from left to right.

As shown in FIG. 5(b) while scanning device 6 reads H address code marks, scanning devices LO-L3 produce successive output pulses. Therefore, from the foregoing it can be seen that the H address code and the output from the horizontal scanning devices, is utilized to indicate when the carriage has reached a particular group of storage positions arranged at one horizontal level. The L address code, and the output from the code strip scanning devices, then indicate one particular storage position within the group of storage positions. The combination of the L address code and the H address code serves to uniquely identify one particular storage position.

Figure 6:
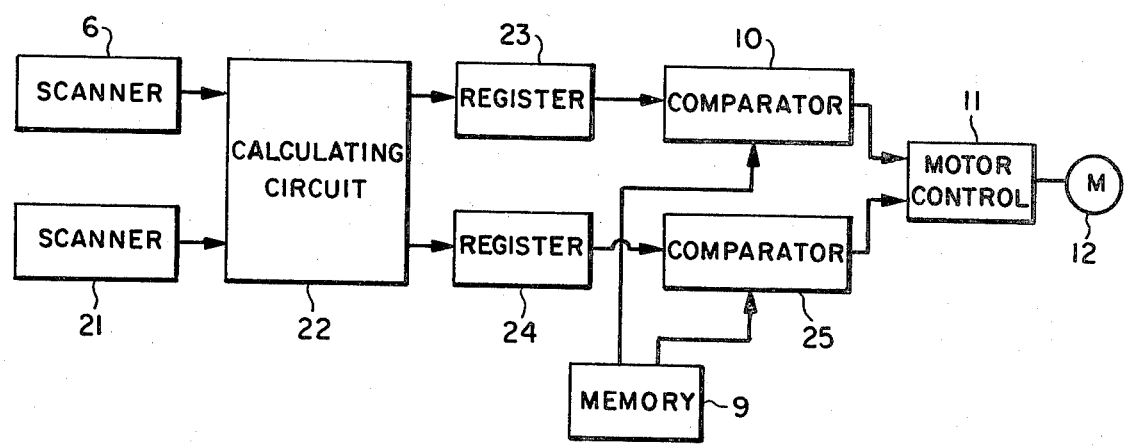

FIG. 6 illustrates a control circuit for use with the instant invention. The output of scanning device 6 is placed into register 23 via calculating circuit 22. The contents of register 23 are compared with the H address code stored in temporary memory 9 by comparing device 10. When a comparison is indicated comparing device 10 will transmit a low speed signal to motor control circuit 11 so that the movable column will be driven at low speed in the horizontal direction.

The outputs of code strip scanning devices 21 are stored in register 24, via circuit 22, while the movable column is being driven at low speed. The L address code, stored in temporary memory 9, is compared with the contents of register 24 by comparing device 25. When a comparison is reached a stop signal is sent to motor control circuit 11, and motor 12 is stopped, which halts carriage 3. This procedure serves to accurately stop the carriage at the designated storage position. It is to be understood that carriage 3 may be placed in the low speed mode at the same time carriage 3 passes over the designated storage position, i.e., if the carriage is passing over the LO address and the carriage may pass the designated storage position. However at the next position the H address code will be increased by 1 and the carriage will continue to be driven until comparing devices 10 and 25 are in accord.

The foregoing has explained the principal construction of the control operation. However, in actual operation, it is preferred to hasten the response time of entering the low speed mode of the carriage considering the inertia and the weight of the column and the carriage. For example, it is preferred to enter the low speed mode several addresses, 2 addresses for instance, before reaching the designated address. This is easily accomplished by modifying the control circuit, of FIG. 6.

Figure 7:
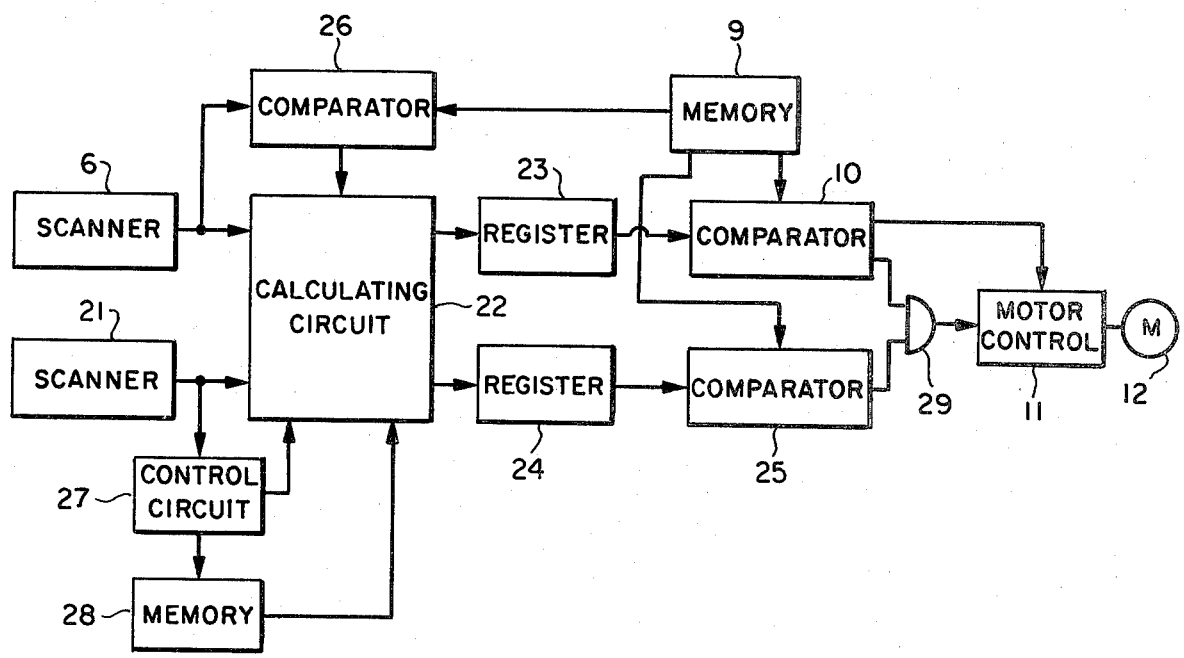

Referring to FIG. 7, comparator 26 compares 5 H address codes consisting of HK−2, HK−1, HK, HK+1 and HK+2. The H address code stored in temporary memory 9 is defined as HK. The output of scanning device 6 is compared with each of the 5 addresses by comparator 26 and an output signal is sent to calculating circuit 22. Calculating circuit 22 transmits this comparison information and the output of scanning device 21 to register 23.

The contents of register 23 are compared with the H address code stored in temporary memory 9 by comparing device 10. When there is no comparison, i.e., when the carriage is at HK−2, HK−1, HK+1 or HK+2 the low speed signal is given to the motor control circuit 11, and consequently, the column and therefore the carriage moves at low speed.

Calculating circuit 22 writes the L address into register 24 by receiving the output of code strip detection device 21.

Comparing device 25 compares the contents of register 24 and the L address code stored in temporary memory 9. A stop signal is sent to the motor when a comparison is reached.

Alternatively, control circuit 27 monitors the output of code strip scanning device 21, and if the output of the L3 scanning device is observed after the output of the L2 scanning device, a "1" is written into memory 28. Next when the output of LO is observed, the contents of memory 28 are written into calculating circuit 22, which in turn advances the H address code in register 23 by 1.

After completion of the operation the contents of memory 28 are erased.

Similarily control circuit 27 monitors the output of the scanning devices and when the output of scanning device LO is observed after the output of scanning device L1 a "1" is written into memory 28. When the output of L3 is subsequently observed, the contents of memory 28 are written into calculating circuit 22, which in turn reduces by 1 the H address code in register 23.

After the completion of the operation, the contents of memory 28 are erased. Thus, when the contents of register 23 and the H address code stored in temporary memory 9 are in accord, comparing device 10 sends out a stop signal besides maintaining the low speed signal send out before these outputs were in accord. This stop signal and the stop signal of comparing device 25 are applied to And circuit 29, and when both stop signals are present And circuit 29 applies a stop signal to motor control circuit 11 and the motor stops.

This serves to position the carriage at the designated storage position.

For positioning in the vertical direction, the control circuit of FIG. 2 can be used as it is and therefore the explanation and drawing for such a circuit are omitted.

However the detection of the code strip by code strip scanning device 21 is impossible if the carriage is still moving vertically on the column when the operation of the column is changed to the low speed mode.

It is preferred to make calculating circuit 22 (FIG. 6, FIG. 7) operative in response to the signal obtained from motor control circuit 15 when motor 16 is stopped by control circuit 15 of FIG. 1.

To release the above-mentioned temporary stop signal when the carriage is positioned at the designated horizontal address (given by H address and L address) the output signal of comparing device 26 of FIG. 7 is applied to the vertical direction motor control circuit 15 as the temporary stop signal of the vertical direction's operation.

The above-mentioned examples have employed a 2 step address system, H address and L address, for the horizontal address only. However it is obvious that the same system could also be applied to the vertical address. It is also to be understood that other methods may be used for the code marks, the scanning and detective methods, the detective devices HO-HS and the detective devices LO-L3. Such methods as explained in the U.S. Pat. No. 3,526,326 include reflecting tape, light sources photocells, and magnets and magnetized material detecters.

This invention is especially effective when each storage position is small, for example, when individual file books are stored in each storage position. This invention can also be applied to other apparatus such as apparatus which either retrieves or stores, apparatus which detects storage positions only, or apparatus to detect the presence of commodities at the storage positions.

Although a specific embodiment of this invention has been shown and described it will be understood that various modifications may be made without departing from the spirit of this invention.

What is claimed is:

1. An automatic positioning system for a commodity carriage in an automatic storage system, comprising, shelves arranged to have commodity storage positions extending in the vertical and horizontal direction,
a commodity carriage adopted to move up and down and right and left along a front face of the shelves,
vertical position code marks and horizontal position code marks identifying said storage positions, said code marks arranged within the movable range of the carriage, a code scanning device included within the carriage for reading said position code marks,
a control circuit responsive to an output of said code scanning devices for controlling the operation of the carriage and for stopping the carriage at a position facing a designated storage position, said position code marks identifying N storage positions in either the vertical or horizontal direction as one group of storage spaces, wherein N is a natural number larger than 1 but much less than the total number of storage positions extending in either the vertical or horizontal direction, each group of N storage spaces including a reference mark at a predetermined position within the N storage spaces,
N mark scanning devices for detecting the N marks are installed on the carriage to correspond to N spaces of storing positions face to face, the detecting circuit is built into the above-mentioned first control circuit to detect which one of the N pieces of mark detective devices has output, and the feature controlling the movement of the carriage to receive output from the mark detective device corresponding to the designated storing position.

2. An automatic positioning system for commodity carriage in an automatic storage system, comprising shelves arranged to have commodity storage positions extending in the vertical and horizontal direction, a commodity carriage adapted to move up and down and left and right along a front face of the shelves, vertical position code marks and horizontal position code marks for identifying individual storage positions, a first group code scanning device responsive to the code marks for detecting a group of N adjacent storage positions, wherein N is a natural number larger than 1 but far smaller than the total number of storage positions in either the vertical or horizontal direction, N individual code scanning devices, responsive to the code marks for detecting an individual storage space within a group of storage spaces, and means responsive to the code scanning devices for controlling the operation of the carriage and for stopping the carriage at a designated storage position.

3. An automatic positioning system in accordance with claim 1, wherein there is further included input means for entering identification data into the system, said data uniquely identifying said designated storage position and means for storing the identification data.

4. An automatic positioning system in accordance with claim 1, wherein said control means is responsive to said group scanning device for slowing the movement of the commodity carriage.

5. An automatic positioning system in accordance with claim 2, wherein said control means is responsive to both the group scanning device and the individual scanning devices for stopping the commodity carriage.

6. An automatic positioning system in accordance with claim 3, wherein said scanning devices are mounted on said commodity carriage.

7. An automatic positioning system in accordance with claim 4, wherein there is further included means for detecting groups of storage positions immediately adjacent to the storage position group containing said designated storage position, and means responsive to the detecting means for slowing the movement of the commodity carriage at the time the commodity carriage is adjacent to any of the adjacent groups of storage positions.

8. An automatic positioning system in accordance with claim 5, wherein there is further included means for comparing the data stored in said storing means with an output signal from said scanning devices and means responsive to said comparing means for operating said control means.

* * * * *